US006648650B1

(12) United States Patent
Fiorella

(10) Patent No.: US 6,648,650 B1
(45) Date of Patent: Nov. 18, 2003

(54) COMPOSITION FOR AIDING IN TOILET TRAINING AND METHOD FOR USING SAME

(76) Inventor: Erica F. Fiorella, 7114 Davis Rd., Waxhaw, NC (US) 28173

( * ) Notice: Subject to any disclaimer, the term of this patent is extended or adjusted under 35 U.S.C. 154(b) by 0 days.

(21) Appl. No.: 10/158,809

(22) Filed: May 30, 2002

(51) Int. Cl.[7] .............................................. G09B 19/00
(52) U.S. Cl. ....................... 434/247; 434/258; 434/236; 434/238; 4/661
(58) Field of Search ................................ 434/247, 258, 434/238, 236; 4/661

(56) References Cited

U.S. PATENT DOCUMENTS

| 3,269,845 A | * | 8/1966 | Pomeroy | 426/250 |
| 4,380,553 A | * | 4/1983 | Schmidt | 426/250 |
| 5,353,449 A | * | 10/1994 | Rubenstein et al. | 4/661 |
| 5,597,596 A | * | 1/1997 | Henderson | 426/242 |
| 6,093,258 A | * | 7/2000 | Mc Lean et al. | 134/42 |
| 6,183,850 B1 | * | 2/2001 | Lauer | 428/304.4 |

* cited by examiner

Primary Examiner—Derris H. Banks
Assistant Examiner—Dmitry Suhol
(74) Attorney, Agent, or Firm—Adams Evans P.A.

(57) ABSTRACT

A powder for use as a toilet training aid changes from substantially white to a non-white color upon contacting water. The powder-includes at least one powdered water-soluble color additive, and at least one salt for providing a uniform dispersion of color from the color additive when in contact with water. The salt is preferably selected from the group consisting of sodium bicarbonate, sodium chloride, magnesium sulfate, and magnesium chloride. The color additive is preferably a water-soluble powder certified by the United States Food and Drug Administration for use in drugsand cosmetics or for use in food, drugs and cosmetics. After repeated use, the child develops a positive mental association between the act of using the toilet and the amusement derived from watching the change of color, thereby making toilet training easier.

3 Claims, No Drawings

COMPOSITION FOR AIDING IN TOILET TRAINING AND METHOD FOR USING SAME

TECHNICAL FIELD AND BACKGROUND OF THE INVENTION

The invention relates to a composition for assisting in the toilet training of children. The composition is a powder mixture that changes from white to a desired color upon contacting water. The color change of the powder provides a source of amusement to a child to encourage his or her use of the toilet.

Toilet training is often a difficult and tedious task for both parent and child. Children are often intimidated or simply disinterested in the prospect of making the transition from diapers to regular toilet use. Forcing an unwilling child to use a toilet can be counterproductive and reinforce the child's fear or dislike for the activity.

There is a need for toilet training aids that make the experience of using the toilet more enjoyable for the child, thereby encouraging use of the toilet and making toilet training easier for the parent. An activity in which the source of amusement to the child is directly related to the activity of urinating in the toilet would have the strongest effect in developing a positive incentive in the child's mind for using the toilet.

In an effort to overcome and eliminate the aforementioned problems, the present invention was conceived.

SUMMARY OF THE INVENTION

Therefore it is an object of the present invention to provide a toilet training aid that encourages a child to use the toilet by providing a source of amusement that directly results from the child's use of the toilet.

It is another object of the invention toproviden acomposition that changes from white to a desired vibrant color upon wetting of the composition by urine.

These and other objectives of the present invention are achieved by providing a powder for use as a toilet training aid that changes from a substantially white color to a non-white color upon contacting water. The powder includes at least one powdered water soluble color additive, and at least one salt for providing a uniform dispersion of color from the color additive when in contact with water.

According to one preferred embodiment of the invention, the salt is present in a proportion of from two hundred to four hundred parts by volume to one part of the color additive.

According to another preferred embodiment of the invention, there is two hundred eighty-eight parts by volume of the salt to one part of the color additive.

According to yet another preferred embodiment of the invention, the salt is selected from the group consisting of sodium bicarbonate, sodium chloride, magnesium sulfate, and magnesium chloride.

According to yet another preferred embodiment of the invention, the color additive is selected from the group consisting of solid water-soluble color additives certified by the United States Food and Drug Administration foe use in drugs and cosmetics and solid water-soluble color additives certified by the United States Food and Drug Administration for use in food, drugs and cosmetics.

According to yet another preferred embodiment of the invention, the color additive is selected from the group consisting of D&C Red No. 33 powder and FD&C Blue No. 1 powder.

According to yet another preferred embodiment of the invention, the powder includes corn starch in a proportion of from one to two hundred parts by volume to one part of the color additive.

According to yet another preferred embodiment of the invention, the powder includes approximately ninety-six parts by volume of corn starch to one part. of the color additive.

According to yet another preferred embodiment of the invention, the powder includes citric acid to provide effervescence of the powder upon contact with water.

According to yet another preferred embodiment of the invention, the citric acid is encapsulated in a moisture resistant capsule to prevent contact between the citric acid and moisture in the air.

An embodiment of the method for toilet training a child according to the invention includes the steps of providing a powder that changes from a substantially white color to a non-white color upon contacting water comprising at least one color additive, and at least one salt to provide a uniform dispersion of color from the color additive when in contact with water. The powder is placed in a child's training toilet, and the child is positioned appropriately so he or she urinates into the toilet thereby changing the color of the powder. The above steps are repeated to develop a mental association in the child between the visual stimulation derived from viewing the color change of the powder and. the act of using the toilet so as to encourage regular use of the toilet.

Another embodiment of the method for toilet training a child according to the invention includes providing a powder with a particular color additive to bring about a particular color change in the powder desired by the child.

Another embodiment of the method for toilet training a child according to the invention includes providing a powder comprising citric acid to provide an effervescent reaction in the powder upon contacting water to enhance the visual stimulation received by the child.

DESCRIPTION OF THE PREFERRED EMBODIMENT AND BEST MODE

The invention relates to a composition used to assist parents in toilet training young children. The composition is a powdered mixture generally comprising at least one salt and at least one water-soluble color additive in powdered or granulated form. The powder is placed dry in a child's toilet. Water in the child's urine activates a change in color of the powder from white to a vibrant non-white color. The color change of the powder provide a visual stimulation to the child to encourage him or her to regularly use the toilet.

The composition preferably includes at least one of the following salts: sodium bicarbonate, magnesium sulfate, magnesium chloride, and sodium chloride, including rock salt (halite) and sea salt. The salt is ground to a fine powder and mixed with a relatively small amount of a water-soluble color additive. It should be understood that the salt, as referenced throughout this application, is in a powder or finely granulated form.

Preferably, the color additive is a powder and one of the water-soluble color additives certified by the United States Food and Drug Administration for use in drugs and cosmetics, designated"D&C", or certified for use in food, drugs and cosmetics, designated "FD&C." A detailed description of these certified color additives can be found in Title 21, Part 74 of the United States Code of Federal Regulations, 21 C.F.R. §74.101 through §74.3710, which is incorporated herein by reference. For example, FD&C Blue No. 1, as described in 21 C.F.R. §74.101, and D&C Red No. 33, as described in 21 C.F.R. §74.1333, have been found to be particularly effective in the invention.

It has been determined that the following examples of various formulations, shown in Table A, are preferred embodiments of the invention:

TABLE A (All values in percent by volume)

| Example No. | Sodium Bicarbonate | Color Additive | Corn Starch | Citric Acid |
|---|---|---|---|---|
| 1 | 99.66 | .34 | 0 | 0 |
| 2 | 74.79 | .25 | 24.96 | 0 |
| 3 | 49.83 | .34 | 49.83 | 0 |
| 4 | 59.85 | .21 | 19.97 | 19.97 |

A convenient amount of example 4, shown above in Table A, can be made by mixing three-fourths of a cup (177.4 milliliters) of sodium bicarbonate, one-eighth of a teaspoon (0.6 milliters) of a water-soluble FDA certified color additive powder, one-fourth of a cup (59.2 milliters) of corn starch, and one-fourth cup (59.2 milliliters) of citric acid. Citric acid is added to provide effervescence in the powder when it is exposed to water to create an effect similar to a bath bomb. However, it is important to protect the citric acid from moisture in the air to avoid activation of the color and clumping prior to the powder being used. Therefore, the citric acid is preferably encapsulated in a moisture resistant capsule which dissolves in liquid. Preferably, there is two hundred to four hundred parts of sodium bicarbonate, and one to two hundred parts of corn starch, to every one part of color additive.

Additional salts, such as magnesium sulfate, magnesium chloride, and sodium chloride can be added to any of the above formulations. Also, combinations of various color additives can be used together, such as FD&C Blue No. 1 and D&C Red No. 33 to produce a purple color when the powder contacts water. Finally, fragrance can be added to the powder to enhance its sensory appeal.

The addition of talc to any of the above formulations is not recommended as it results in a powdery residue and clumps in the bottom of the toilet bowl. A mixture of corn starch and color additive, without any salt, is also ineffective for the same reason.

The powder has a generally white appearance prior to use due to the relatively small amount of color additive that is present in proportion to the much larger amount of salt, and other preferred ingredients. Approximately one-half teaspoon (2.5 milliliters) of the powder is sprinkled inside a dry child's training toilet. The child is positioned appropriately over the toilet so that he or she can urinate into the toilet. As the child's urine contacts the powder the color additive turns the powder from its original white to a vibrant color. The color is determined by the particular color additive that is used in the powder.

Generally, the color of the activated powder is the same as the color additive itself. However, the resulting powder color may be different, as in the case of D&C Red No. 33, which usually yields an orange colored powder after the powder has contacted urine. The child typically experiences amusement upon seeing the powder change from white to a bright and vibrant color. The powder disperses, all around the interior of the toilet to completely change its color.

After repeated use of the powder over time the child develops a mental association between the act of using the toilet and the amusement of watching the changing of the color of the powder. This encourages the child to continue using the toilet and makes toilet training easier and more enjoyable for all parties involved.

A color-changing composition for use as a toilet training aid and a method of using same is disclosed above. Various embodiments of the invention can be made without departing from its scope. Furthermore, the foregoing description of the preferred embodiments of the invention and the best mode for practicing the invention are provided for the purpose of illustration only and not for the purpose of limitation—the invention being defined by the claims.

I claim:

1. A method for toilet training a child comprising the steps of:

(a) providing a powder that changes from substantially white to a non-white color upon contacting water comprising:
      (i) at least one water-soluble color additive in powder form, and
      (ii) at least one salt for providing a uniform dispersion of color from the color additive when the powder contacts water;
   (b) placing the powder in a child's training toilet;
   (c) positioning a child in an appropriate position so the child urinates into the toilet thereby changing the color of the powder;
   (d) repeating steps (a) through (c) to develop a mental association in the child between the visual stimulation derived from viewing the color change of the powder and using the toilet so as to encourage regular use of the toilet.

2. A method for toilet training a child according to claim 1, wherein the step of providing a powder that changes from a substantially white color to a non-white color upon contacting water further comprises providing a powder with a particular color additive to bring about a particular color change in tho powder desired by the child.

3. A method for toilet training a child according to claim 1, wherein the step of providing a powder that changes from a substantially white color to a non-white color upon contacting water further comprises providing a powder comprising citric acid to provide an effervescent reaction in the powder upon contacting water to enhance the visual stimulation received by the child.

* * * * *